C. S. SCHROEDER.
FRAME CONSTRUCTION FOR INDUSTRIAL TRUCKS.
APPLICATION FILED OCT. 24, 1921.
1,411,875.  Patented Apr. 4, 1922.
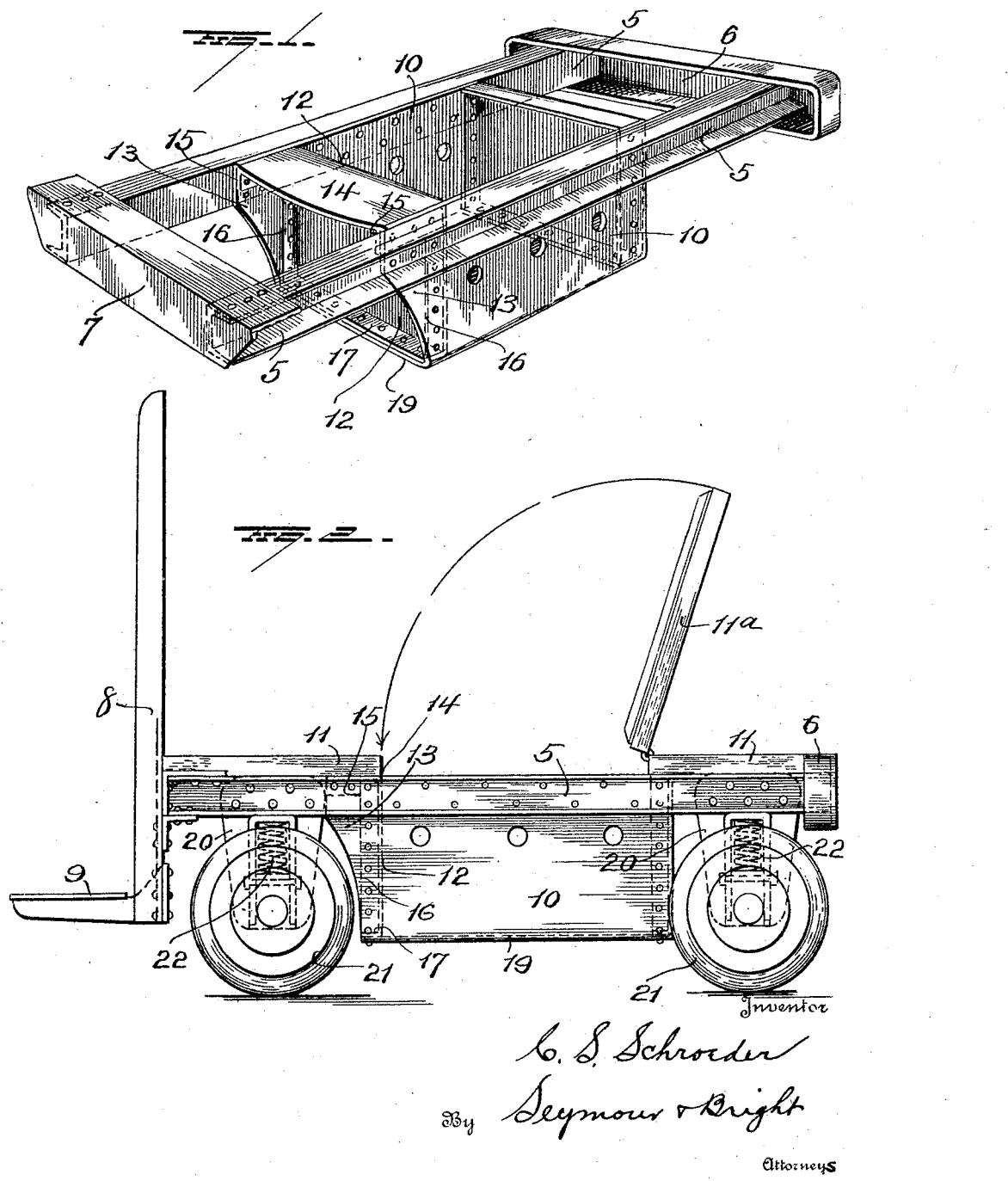

UNITED STATES PATENT OFFICE.

CHARLES S. SCHROEDER, OF STAMFORD, CONNECTICUT, ASSIGNOR TO THE YALE & TOWNE MANUFACTURING COMPANY, OF STAMFORD, CONNECTICUT.

FRAME CONSTRUCTION FOR INDUSTRIAL TRUCKS.

1,411,875. Specification of Letters Patent. Patented Apr. 4, 1922.

Application filed October 24, 1921. Serial No. 509,814.

*To all whom it may concern:*

Be it known that I, CHARLES S. SCHROEDER, a citizen of the United States, and a resident of Stamford, in the county of Fairfield and State of Connecticut, have invented certain new and useful Improvements in Frame Constructions for Industrial Trucks; and I do hereby declare the following to be a full, clear, and exact description of the invention, such as will enable others skilled in the art to which it appertains to make and use the same.

My invention relates to the frame construction of industrial trucks, the object being to produce a strong and rigid frame, that will be light in weight and low in cost by utilizing members that are normally dead weight to strengthen a relatively light frame.

Heretofore the common practice in this type of vehicles has been to so dispose the battery container as to make it a burden on the frame instead of a reinforcement for the latter. With my improvement the battery container or box is so constructed and connected with the vehicle frame as to greatly strengthen the latter against bending and torsional strains, thus permitting of the use of a much lighter frame than would otherwise be necessary.

In the accompanying drawing, Figure 1 is a view in perspective of a truck frame embodying my invention and Figure 2 is a view in side elevation of the truck, part of the platform being raised to permit of access to the battery container or box.

5 represents the metal side member of the truck frame preferably made of channel section connected at the rear by a pressed steel bumper 6, and at the front by the L-shaped angle member 7 to which the uprights 8 carrying the operator's platform 9 is secured.

Located between and secured to the inner faces of the side members 5, is the battery box or container 10, the side and also the end members of which are riveted to the said side members 5 thus solidly uniting and stiffening and bracing the two side members intermediate their ends and immediately under the load carrying platform 11 which as shown in Figure 2 is secured on said side members 5.

The two side members of the battery box or container 10, are continued forward in advance of the front end member 12 thereof, as at 13, and are widened upwardly thus forming a support and brace for the forwardly bent end 14 of the front end 12 of the box 10, which forwardly bent end is provided with downwardly turned side flanges 15 which are riveted to the widened upper ends of the projecting ends 13 of the side members of the box and also to the side members 5 of the truck frame. The side edges of the front end 12 of the container are flanged as at 16 which flanges are riveted to the side members of the container, and it is also flanged at its lower end as at 17, which flange is riveted to the bottom member 19 of the container.

The construction above described forms a stiff and rigid front end to the container, which with the container itself riveted to the side members 5 of the truck frame, strengthens the latter both in bending and in torsion.

The rear end of the container is also flanged and riveted to the sides of the container and to the side members 5 of the truck, so that the container instead of being simply a dead weight and without assisting in strengthening the truck frame, is a reinforcement therefor and braces the latter intermediate the wheels, thus producing a frame that is exceedingly strong and rigid, without adding to the weight thereof.

The platform 11 which is secured to the side members 3, constitutes the load carrying platform of the truck and is provided with a central hinged section 11ª which when opened as shown in Figure 2 affords ready access to the battery container.

Rigidly secured to the underside of the side members 5 of the frame adjacent the two ends thereof are the wheel pedestals 20 in which the bearings carrying the wheels 21 supporting the truck are mounted, the said bearings being preferably sustained by the coiled springs 22 located within the pedestals or wheel supporting standards.

It is evident that many slight changes might be resorted to in the relative arrangement of parts shown and described without departing from the spirit and scope of my invention, hence I would have it understood that I do not wish to confine myself to the exact construction and arrangement of parts shown and described but, Having fully described my invention what

I claim as new and desire to secure by Letters-Patent, is:—

1. In a frame for trucks, the combination of metal side members and a metal battery container riveted to said members and provided with a reinforced front end the latter also being secured to said side members.

2. In a frame for trucks, the combination of metal side members and a metal container riveted thereto, the front end of said container having an integral forwardly projecting top flange riveted to the side members of the frame.

3. In a frame for trucks, the combination with metal side members and a metal container riveted thereto, the front end of said container having an integral forwardly projecting top flange riveted to the side members of the frame and also to the projecting ends of the side members of the container.

4. In a frame for trucks, the combination of metal side members mounted on wheels and a metal container depending from said side members and riveted thereto, the front end of said container having an integral forwardly projecting top flange riveted to the frame.

5. In a frame for trucks, the combination of metal side members supported on wheels, and a metal container depending from said side members and riveted thereto, the front ends of the side members of said container projecting forwardly in advance of the front end of the container, the said front end having an integral forwardly projecting top flange riveted to the frame and also to the projecting ends of the side members of the container.

In testimony whereof, I have signed this specification in the presence of two subscribing witnesses.

CHARLES S. SCHROEDER.

Witnesses:
FRANK C. PRUCHA,
CHARLES A. BERRY.